United States Patent [19]

Nordkvist

[11] Patent Number: 5,184,522
[45] Date of Patent: Feb. 9, 1993

[54] GEARBOX FOR MOTOR VEHICLE

[75] Inventor: Kjell Nordkvist, Södertälje, Sweden

[73] Assignee: Saab Automobile Aktiebolag, Sweden

[21] Appl. No.: 768,605

[22] PCT Filed: Feb. 21, 1991

[86] PCT No.: PCT/SE91/00130
§ 371 Date: Oct. 17, 1991
§ 102(e) Date: Oct. 17, 1991

[87] PCT Pub. No.: WO89/03946
PCT Pub. Date: May 5, 1989

[30] Foreign Application Priority Data

Feb. 22, 1990 [SE] Sweden .................. 9000628

[51] Int. Cl.⁵ .................................. F16H 3/08
[52] U.S. Cl. ............................ 74/359; 74/331; 74/375
[58] Field of Search ................ 74/359, 375, 331

[56] References Cited

U.S. PATENT DOCUMENTS

| | | | |
|---|---|---|---|
| 1,276,951 | 8/1918 | Oster | 74/375 |
| 2,553,376 | 5/1951 | Tourneau | 74/331 X |
| 2,587,431 | 2/1952 | Barlow et al. | 74/359 X |
| 3,073,423 | 1/1963 | Lee et al. | 74/331 X |
| 3,080,767 | 3/1063 | Price, Jr. | 74/331 X |
| 3,318,168 | 5/1967 | Coye de Castelet | 74/331 X |
| 3,362,245 | 1/1968 | Francuch et al. | 74/359 |
| 4,549,443 | 10/1985 | White | 74/331 X |
| 4,570,503 | 2/1986 | Theobald | 74/331 X |
| 4,589,295 | 5/1986 | Jerry et al. | 74/331 X |
| 4,594,908 | 6/1986 | Akashi et al | 74/359 |
| 4,640,141 | 2/1987 | Knödel et al. | 74/359 X |
| 4,667,526 | 5/1987 | Young | 74/359 X |
| 4,677,874 | 7/1987 | Friedrich | 74/359 X |
| 4,776,227 | 10/1988 | Janiszewski | 74/359 X |
| 4,802,373 | 2/1989 | Saint-Jean et al. | 74/359 |
| 5,009,118 | 4/1991 | Raszkowski et al. | 74/331 |

FOREIGN PATENT DOCUMENTS

| | | | |
|---|---|---|---|
| 0128319 | 12/1984 | European Pat. Off. | |
| 2065300 | 4/1973 | Fed. Rep. of Germany | |
| 59-126140 | 7/1984 | Japan | 74/359 |
| 70241 | 10/1928 | Sweden | 74/359 |
| 433870 | 6/1984 | Sweden | |
| 451005 | 3/1985 | Sweden | |
| 8903946 | 5/1989 | World Int. Prop. O. | |

*Primary Examiner*—Leslie A. Braun
*Assistant Examiner*—David E. Henn
*Attorney, Agent, or Firm*—Ostrolenk, Faber, Gerb & Soffen

[57] ABSTRACT

A mechanical stepped gearbox comprises a number of gear wheel pairs (25-34) which interact with one another and are arranged on an input shaft (19), an output shaft (22), and a first side shaft (24). The gear wheel pairs can be selectively coupled in order to form different gear ratios. In addition to this, the gearbox comprises, arranged on a second side shaft (40), a gear wheel (39) which is used both in order to bring about a reverse gear and in order to transmit driving force to the first side shaft (24). The gearbox can thus be designed with short axial extend even when the gearbox comprises many gear steps.

18 Claims, 1 Drawing Sheet

GEARBOX FOR MOTOR VEHICLE

The invention relates to a gearbox for a motor vehicle which can be more compact and can be mounted transversely, through the placement of gears in the transmission on various shafts.

STATE OF THE ART

Gearboxes for use in passenger cars are dimensioned in order to permit driving at different speeds while utilizing combustion engines that permit the most economical driving within a limited engine speed range. In association with an increased requirement for performance and at the same time a requirement for economical driving, there is an increased requirement for more gear steps in the gearboxes.

More gear steps can be arranged by mounting more gear wheels in the gearbox on its existing shafts. This means that the gearbox is given an axially longer extent. For vehicles with a longitudinally mounted gearbox, this is no great problem. On the other hand, for vehicles with a transverse gearbox, the space in the transverse direction of the vehicle is critical, since an increased gearbox length is not usually possible without the width of the vehicle having to be increased. The use of a transverse gearbox affords the possibility of building the gearbox together with the drive engine of the vehicle, so that a complete drive aggregate is obtained. This in turn makes it possible to build the drive aggregate compactly and to use the available space in the vehicle effectively. The possibilities for increasing the number of gears while retaining the axial length of the gearbox are limited and presuppose that it is possible in another manner to reduce the axial length of other components in order thus to create new space for more gear wheels in the gearbox. For modern vehicles, which to a great extent are already optimised in said respect, there are problems in creating such space. This problem is further aggravated by the fact that it is usually the cars with the most powerful engines which, with a view to increasing the maximum speed of the vehicle, it is most important to provide with more gear steps. Since these cars can transmit a very high driving torque, gear wheels, couplings and other components in the gearbox must be dimensioned for these torques, which further increases its axial extent.

A known manner of reducing the axial extent of a gearbox is to replace the conventional synchronising couplings with other, narrower types of non-synchronised couplings in order thus to make space to further gear wheels. However, the requirement thus arises to arrange synchronising in another manner, for example by suitable engine control or by arranging so-called central synchronising arrangement. Such solutions comprise both expensive and complicated control systems and have not come into practical use in series-produced vehicles.

AIM OF THE INVENTION

The aim of the invention is to make it possible that a gearbox can be designed with more gear steps without its axial extent increasing. The gearbox is particularly advantageously to be capable of being used in transverse drive aggregates for use in motor vehicles. Moreover, the gearbox is to be capable of comprising synchronising couplings which are usual for gearboxes, as well as also being constructed around conventional and proven components. The gearbox is to be based on usual gear wheel technology with its possibilities for manufacturing the gearbox at low cost and to have a high degree of efficiency, at least in the majority of driving conditions.

BRIEF DESCRIPTION OF THE INVENTION

The abovementioned aim is achieved in that the gearbox is designed with an input shaft connectable to the engine, an output shaft parallel to the input shaft and connectable with the drive to the wheels. The input shaft holds some driving gears that are engaged with respective gears on the output shaft. A first side shaft holds other driving gears that are engaged with other respective gears on the output shaft. A second side shaft is driven by the input shaft and holds a gear that drives the first side shaft to rotate and that also drives a gear on the output shaft that provides reverse rotation. It is not necessary therefore to put all of the forward gears in a row along the input shaft. Means at each engaged gear pair selectively couples one set of the normally engaged gears to drive the output shaft. By virtue of, according to the invention, arranging a separate gear wheel in order to transmit driving torque to a side shaft, it is made possible that certain gears are operated on the side shaft. The length of the input shaft of the gearbox can thus be reduced. According to the invention, the same gear wheel is used in order to bring about a reverse gear. Further gear wheels are not required for this, which allows further reduction of its axial length. Advantageous embodiments are indicated in the attached drawings. The preferred embodiment described below shows various ones of the gears affixed to their respective shafts while other gears are selectively coupleable and uncoupleable therefrom, the coupling causing two cooperating gears to drive the output shaft. Further advantages and features which characterise the invention emerge from the attached exemplary description of an advantageous embodiment of the invention.

BRIEF DESCRIPTION OF THE DRAWINGS

The exemplary description is given with reference to the attached drawings, in which.

DESCRIPTION OF AN EXEMPLARY EMBODIMENT

Figure 1:
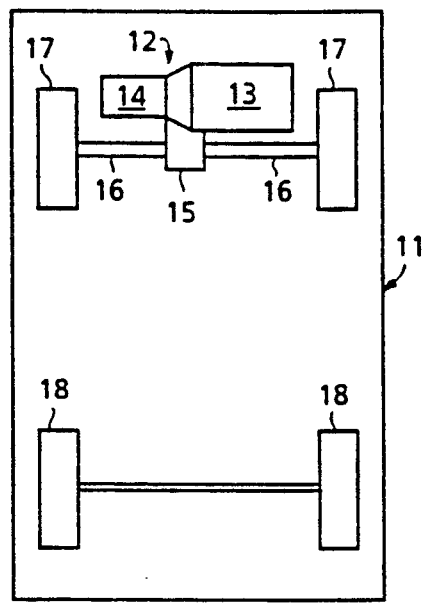
FIG. 1 shows a diagrammatic vehicle with a gearbox according to the invention.

A motor vehicle is exemplified in FIG. 1 by a diagrammatically shown front-wheel drive passenger car 11 which comprises a transverse drive aggregate 12 in the front end of the vehicle 11. The drive aggregates consists of a combustion engine 13 built together with a mechanical stepped gearbox 14, which gearbox 14, via a differential gear 15 and drive shafts 16, transmits driving force to the front, driving wheels 17 of the vehicle. The car also comprises freely rotating rear wheels 18.

Figure 2:
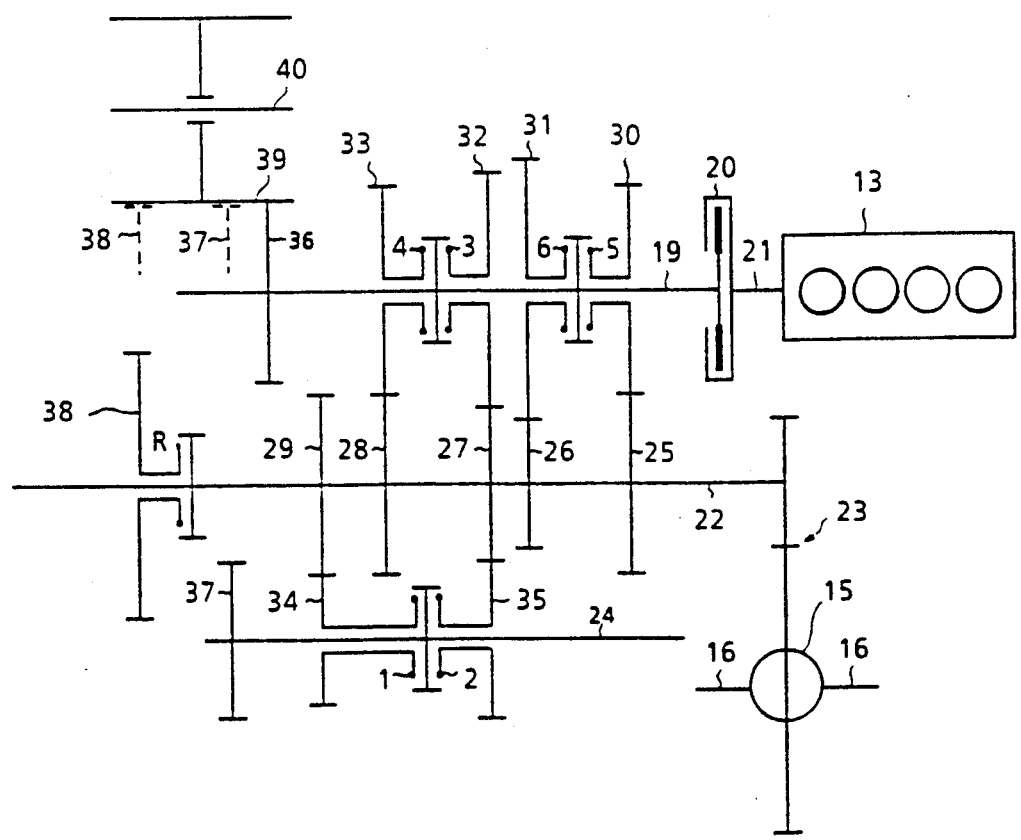
FIG. 2 shows diagrammatically a gearbox according to the invention.

Attached FIG. 2 shows diagrammatically in greater detail the design of the gearbox 14. The gearbox 14 comprises a main input shaft 19 which, via a clutch 20, is connected to and driven by an output shaft 21 of the engine 13. The gearbox 14 also comprises a main output shaft 22 connected to the differential gear 15 via a toothed gear 23, from which differential gear 15 driving forces are transmitted to the drive shafts 16 of the driving wheels 17.

The main input shaft 19 and main output shaft 22 of the gearbox 14 are parallel to one another and to the crankshaft of the engine 13. Also included in the gearbox 14 is a side shaft 24. Mounted in a fixed manner on the output shaft 22 so as to rotate in unison therewith are five different gear wheels 25-29, four of which 25-28 are in constant engagement with four gear wheels 30-33 which are mounted on the input shaft 19 to rotate normally with respect thereto. By means of selectively operable coupling members 3-6 arranged on the input shaft 19, the four gear wheels 30-33 can selectively coupled in a fixed manner to input shaft 19 so as to rotate in unison therewith. The four gear wheels 30-33 and 25-28 respectively on the input shaft 19 and the output shaft 22 respectively constitute four different gear wheel pairs which form different gear ratios for the gearbox 14.

In the same manner, two side gear wheels 34, 35 are rotatably mounted around the side shaft 24, one 34 of which engages with the gear wheel 29 on the output shaft 22 and forms a gear wheel pair. The second gear wheel 35 on the side shaft 24 engages with the gear wheel 27 on the output shaft 22 and forms with it a gear wheel pair. This gear wheel 27 on the output shaft 22 is thus used in order to form two gear wheel pairs. The gear wheels 34, 35 on the side shaft 24 can also, by means of coupling members 1, 2, be coupled together with the side shaft 24. In FIG. 2, the same reference designations are used for the coupling members 1-6 as correspond to the gear position when the coupling 1-6 in question is activated. The two couplings 1, 2 on the side shaft 24 are thus used in order to couple in the gear positions 1 and 2 while the four couplings 3-6 on the input shaft 19 are used for gear positions 3, 4, 5 and 6. The gearbox 14 thus has six gears for forward operation.

In addition to this, arranged in a fixed manner on the input shaft 19 is a first gear wheel 36 and arranged in a fixed manner on the side shaft 24 is a second gear wheel 37. Arranged on the output shaft 22 is a rotatably mounted third gear wheel 38 which, by means of a coupling R, can be connected in a fixed manner to the output shaft 22. Said coupling R is used in order to couple in the reverse position of the gearbox 14 according to what is to be described in greater detail below. The first, second and third gear wheels 36-38 all engage with a fourth gear wheel 39 which is freely mounted for rotation on second side shaft 40. In FIG. 2, the first side shaft 24 is shown in a lowered position (below shafts 22, 19, 40). In reality, this side shaft 24 is arranged partly behind the output shaft 22 and the input shaft 19. The gear engagement between the second gear wheel 37 and the fourth gear wheel 39 is therefore shown diagrammatically with a broken line.

For the same reason, the gear engagement between the third gear wheel 38 and the fourth gear wheel 39 is also shown by means of a broken line. By virtue of the fact that FIG. 2 in this manner make clear in principle the different gear engagements of the fourth gear wheel, the axial extent of the fourth gear wheel comes to be shown as exaggerated in relation to its actual extent. In reality, the gear engagements are, for example, arranged so that the gear engagement between the first and fourth gear wheels 36 and 39 respectively in relation to the second and the fourth gear wheels 37 and 39 respectively takes place essentially in the same axial plane.

The couplings R and 1-6 are constituted by synchronising couplings which are usual for vehicle gearboxes and which are operated with the aid of conventional coupling forks (not shown). Only one of the couplings R, 1-6 can be activated at a time. The gearbox 14 also has a neutral position N, in which none of the couplings R, 1-6 is activated.

The first, second and third gear wheel 36, 37 and 38 respectively are arranged at one end of their respective shafts 19, 24 and 22 respectively. This end is opposite the end at which the input of the gearbox 14 via the input shaft 19 and its output via the output shaft 22 are arranged. The input and output of the gearbox 14 are thus arranged on the same side.

The functioning of the gearbox 14 described is as follows. Upon activation of one of the couplings 3, 4, 5 or 6, one of the gear wheels 30, 31, 32 and 33 respectively comes to be coupled together in a fixed manner with the input shaft 19 so as to rotate in unison therewith. Driving force is transmitted through the gearbox 14 by interaction with corresponding gear wheels 25-28 on the output shaft 22. At the same time as the input shaft 19 rotates, the fourth gear wheel 39 is driven by the fixed, first gear wheel 36. The second gear wheel 37 on the side shaft 24 thus also comes to be driven with the result that the entire side shaft 24 also rotates. The third gear wheel 38 on the output shaft 22 is also driven but, since the reverse coupling R is not activated, the output shaft 22 is no acted upon by this.

Upon activation of one of the couplings 1 or 2, the gear wheels 34 and 35 respectively come in a corresponding manner, by interaction with corresponding gear wheels 29 and 27 respectively on the output shaft 22, to transmit driving force to the output shaft 22. The driving torque from the input shaft 19 is in this connection is transmitted via the first gear wheel 36, the fourth gear wheel 39 and the second gear wheel 37 to the side shaft 24.

Upon activation of the reverse coupling R, the third gear wheel 38 is coupled together with the output shaft 22. The gear wheel 38 is driven by the gear engagement with the fourth gear wheel 39 in a direction of rotation which is counter to the direction in which the output shaft 22 rotates when any one of the couplings 1 to 6 inclusive is activated. Activation of the coupling R thus has the effect that the output shaft 22 is driven in the opposite direction and the vehicle can be reversed. When the reverse gear is engaged in this manner, the other gear wheels 30-35 also come to be driven in their opposite directions via the gear wheels 25-29. As, however, none of these is connected in a fixed manner to its respective shaft, this has no effect.

The use of the fourth gear wheel 39 according to the present invention means that the entire gearbox 14 can be given axially small dimensions despite a large number of gears. The fourth gear wheel 39 is used on the one hand in order to transmit torque to the side shaft 24 and on the other hand in order to bring about a reverse gear. As a result of this, no further gear wheels or shafts are required in order to bring about a reverse gear.

Instead of, as is conventional arranging the gears 34, 35 attached to respective couplings 1 and 2 on the same shafts as the other couplings gears 30-35, the gearbox 14 according to the invention results in a slightly lower degree of efficiency of gears 34 and 35. This is because of the extra gear engagement between the gear wheels 36, 39 and 37. However, the gear positions 1 and 2 are used in normal driving only on starting and thus for very short periods of time. The reduced degree of efficiency, under these driving conditions, is therefore negligible on the whole.

Within the scope of the attached patent claims, the invention can be modified and designed differently from what is indicated in the above exemplary description. For example, the couplings for the different gear positions R, 1 to 6 inclusive, and the gear wheels likewise, can be arranged in another manner. Similarly, the gearbox 14 can be modified for both fewer and more gear steps than the number in the example.

I claim:

1. A gearbox for a motor vehicle comprising:
   first and second parallel main shafts, one of which constitutes an input shaft and the other of which constitutes an output shaft;
   a first plurality of rotatable gears mounted on the first shaft and a second plurality of rotatable gears mounted on the second shaft; each gear of said first plurality being in operative engagement with an individual gear of the second plurality, with an individual gear of said first plurality and the gear of the second plurality in operative engagement therewith constituting an individual gear wheel pair;
   first coupling means for selectively coupling and uncoupling each of said gear wheel pairs between the first and second shafts for transmitting rotation of the input shaft to the output shaft through engaged gears of the first and second pluralities;
   a first side shaft, at least one side gear mounted on the first side shaft to normally be rotatable with respect thereto, each said side gear being in operative engagement with a different second gear of the second plurality, for coordinated rotation therewith;
   second coupling means for selectively coupling and uncoupling each of said side gear and its operatively engaged gear of said second plurality to the first side shaft and the second shaft for transmitting rotation of the first side shaft to the second shaft through the side gear and the gear of the second plurality in operative engagement therewith;
   a first gear mounted on and rotatable in unison with the first shaft; a second gear operatively coupled with the first gear for coordinated rotation therewith; said second gear mounted on and rotatable in unison with the first side shaft;
   a second side shaft; a rotatable fourth gear mounted on the second side shaft; the first and second gears being in operative engagement with the fourth gear, whereby the first gear on the first shaft transmits rotation to the fourth gear and the lattern gear transmits rotation to the second gear on the first side shaft;
   selective operation of the second coupling means drivingly couple a selected said side gear to said first side shaft to form a drive gear train between the first and second main shafts, which drive gear train includes a series arrangement of said first gear, said fourth gear, said second gear, the selected side gear, and the gear of said second plurality that is in operative engagement with said selected side gear.

2. The gearbox of claim 1, wherein the first coupling means comprises a respective first coupling for operatively connecting each gear of the first plurality gears to the input shaft in driving relationship therewith.

3. The gearbox of claim 2, wherein the second coupling means comprises a respective second coupling for operatively connecting each of the side gears to the first side shaft in driving relationship therewith.

4. The gearbox of claim 1, wherein the second coupling means comprises a respective second coupling for operatively connecting each of the side gears to the first side shaft in driving relationship therewith.

5. The gearbox of claim 1 also comprising:
   a third gear mounted on the second shaft to normally rotate relative thereto, said third gear being in operative engagement with the fourth gear; and
   a third coupling means for selectively coupling and uncoupling driving rotation of the first shaft through the second, fourth and third gears to the second shaft, for defining a reverse gear rotation which when the third coupling means is actuated to cause the output shaft to rotate in the opposite direction from rotation thereof caused by actuation of either of the first or second coupling means.

6. The gearbox of claim 5, wherein the third coupling means comprises a third coupling for selectively coupling and uncoupling the fourth gear to the output shaft in driving relation therewith.

7. The gearbox of claim 5, wherein the third coupling means for selectively coupling the fourth gear to the output shaft comprises a synchronizing coupling.

8. The gearbox of claim 1, wherein the respective engaged gears of the first and second pluralities of gears are so sized as to define different respective gear ratios at the different gear wheel pairs.

9. The gearbox of claim 8, comprising first and second side gears on the first side shaft selectively coupled thereto by second coupling means; each of said first and second side gears being and engaged with a different gear of the second plurality of gears, wherein the respective engaged side gears and gears of the second plurality are so sized that two different gear ratios are defined.

10. The gearbox of claim 9, wherein each gear of the second plurality of gears is secured to the output shaft to rotate therewith, each gear of the first plurality of gears normally being mounted on the input shaft and each of the side gears is normally freely rotatably mounted on the first side shaft.

11. The gearbox of claim 8, wherein the input shaft, the output shaft and the first side shaft are all parallel.

12. The gearbox of claim 11, wherein each of the input shaft, the output shaft and the first side shaft have opposite ends and respective end regions toward their opposite ends;
   the first gear on the input shaft, the gear on the output shaft engaged with the first side gear and the first side gear are arranged toward the same respective end region of the respective shafts thereof.

13. The gearbox of claim 12, wherein the opposite end of the input shaft from the first gear has a respective connection to the drive engine and the opposite end of the output shaft from the third gear has a driving connection to the drive for the wheels of the motor vehicle.

14. The gearbox of claim 11, wherein the second side shaft is also parallel to the first side shaft.

15. The gearbox of claim 1, wherein the first gear is fixedly connected to the input shaft to rotate in unison therewith.

16. The gearbox of claim 1, wherein the second gear is fixedly mounted on the first side shaft to rotate in unison therewith.

17. The gearbox of claim 1, wherein the fourth gear is freely rotatable on the second side shaft.

18. The gearbox of claim 1, wherein each gear of said plurality of second gears is operatively mounted on said second shaft for rotation in unison therewith; and
each gear of said first plurality of gears is operatively mounted on said first shaft for rotation in unison therewith when coupled thereto by said first coupling means and at other times being rotatable with respect to said first shaft.

* * * * *